United States Patent [19]

Kotera

[11] Patent Number: 5,628,702
[45] Date of Patent: May 13, 1997

[54] POWER TRANSMISSION CHAIN

[75] Inventor: Tetsuji Kotera, Nabari, Japan

[73] Assignee: Borg-Warner Automotive, K.K., Nabari, Japan

[21] Appl. No.: 521,168

[22] Filed: Aug. 30, 1995

[30] Foreign Application Priority Data

Sep. 1, 1994 [JP] Japan .................... 6-234074

[51] Int. Cl.$^6$ .................................. F16G 13/04
[52] U.S. Cl. .................................. 474/213
[58] Field of Search .................. 474/212–217, 474/206

[56] References Cited

U.S. PATENT DOCUMENTS

| | | | |
|---|---|---|---|
| 1,868,334 | 7/1932 | Morse | 474/216 |
| 4,342,560 | 8/1982 | Ledvina et al. | 474/157 |
| 4,344,761 | 8/1982 | Steuer | 474/245 |
| 4,650,445 | 3/1987 | Mott | 474/201 |
| 4,832,668 | 5/1989 | Ledvina et al. | 474/155 |
| 4,915,675 | 4/1990 | Avramidis | 474/213 |
| 4,915,676 | 4/1990 | Komeya | 474/213 |
| 5,267,910 | 12/1993 | Maruyama et al. | 474/212 |
| 5,419,743 | 5/1995 | Takeda et al. | 474/157 |
| 5,453,059 | 9/1995 | Avramidis et al. | 474/212 |

*Primary Examiner*—Roger J. Schoeppel
*Attorney, Agent, or Firm*—Hugh A. Abrams, Esq.; Greg Dziegielewski, Esq.

[57] ABSTRACT

A power transmission chain reduces the chordal motion, or up/down motion, of the chain, which permits a reduction in the noise of the chain. In the chain, the inside flank and outside flank of the link teeth are formed to satisfy $P_2 \geq P_1 \geq P_3$ and $R \geq 2 \times P$, when $P_1$ is the pitch between the outside flanks on the mesh pitch line of link plates 2, $P_2$ is the pitch between the inside flanks of two other adjacent link plates that engage with teeth of the links when the chain is stretched nearly straight, and $P_3$ is the pitch between the inside flanks when the chain is wrapped around the sprocket. R is the radius of curvature of the inside flank and P is the chain pitch.

2 Claims, 4 Drawing Sheets

POWER TRANSMISSION CHAIN

BACKGROUND OF THE INVENTION

This invention relates to a power transmission chain. In particular, it relates to a power transmission chain with a large number of interleaved links. Each link has a pair of teeth and a pair of apertures. The links are interleaved in rows or sets and are connected by connecting pins.

Silent chains, or inverted tooth chains, are used as power transmission chain for automobiles, motorcycles, and other vehicles. A conventional silent chain, which is shown in FIG. 9, typically consists of large number of links or link plates 50, each having a pair of teeth 51 and a pair of apertures or pinholes 52. The links are interleaved in rows or sets and connected by connecting pins 53, which are inserted in pinholes 52. Each tooth includes an inside flank 51a and an outside flank 51b, which are joined at the crotch.

During operation of the silent chain, one of the flanks of tooth 51 of link plate 50 engages a tooth of the sprocket for power transmission from the driving sprocket to the driven sprocket. As illustrated in FIG. 10, silent chain 70 forms a polygon by connecting pins 53 that connect the link plates around sprocket 60. In FIG. 10, the solid and broken lines show the positions of the pitch lines of silent chain 70 when sprocket 60 rotates and the rotation phase difference corresponds to the half-period.

Since the silent chain travels in a polygonal motion around the sprocket, the silent chain undertake a chordal motion (up/down motion of the chord or chain strand) of the amplitude $\Delta T$ between the driven and driving sprockets. As a result of study of the noise of silent chains, it is believed that tension fluctuations in the chain occur due to the up/down motion of the chain strand. As a result, the torque of the driven shaft fluctuates, which generates noise.

Additionally, fluctuation of the circumferential speed of the chain occurs due to the up/down motion of the chord, resulting in an angular velocity fluctuations of the driven shaft, which also generates noise.

The present invention is directed to such a conventional situation and its purpose is to offer a power transmission chain that can reduce noise through suppression of chordal up/down motion.

SUMMARY OF THE INVENTION

As a result of the study of the relationship between chordal motion and noise in order to achieve a lower noise chain, the empirical relationship shown in FIG. 6 was derived. FIG. 6 shows the relative values of noise for various magnitudes of chordal motion 0.20 mm $\Delta T$, corresponding to 0 db. That is, −6 db relative evaluation of noise indicates 6 db reduction of noise from the noise of 0.20 mm chordal motion $\Delta T$. In accordance with this relationship, the chordal motion needs to be suppressed as much as possible to reduce the noise. The relationship shown in FIG. 6 is intended to be exemplary of a typical silent chain and does not represent all chain types or all such data.

The applicant of the present invention has previously proposed a chain having a meshing mechanism, which is shown in Japanese Patent Heisei 1-56304, for reducing the noise of a silent chain. In this silent chain, which is shown in FIG. 9, the inside flanks 51a of the links contact the teeth of the sprocket at the beginning of engagement with the sprocket and the outside flanks 51b of the links contact the teeth of the sprocket when the silent chain wraps around the sprocket. In this manner, the contact between the links and the sprocket occurs in two steps to reduce the noise.

The power transmission chain of the present invention is a further development of a chain with such an engagement mechanism. The power transmission chain includes a plurality of links, each having a pair of depending teeth and a pair of apertures. The links are connected by connecting pins inserted into the pinholes. The shape of the inside and outside flanks of each tooth of the link plate is chosen so that the following relationship is satisfied:

$$P_2 \geq P_1 \geq P_3$$

where $P_1$ is the pitch of the outside flanks on the pitch line of the link, $P_2$ is the pitch between the inside flanks of the teeth of two adjacent links and the teeth of the link when the chain is stretched nearly straight in the tight strand, and $P_3$ is the pitch between the inside flanks when the chain is placed on a sprocket. The shape of the inside flank is formed so that $$R \geq 2 \times P$$

is satisfied, where R is the radius of curvature of the inside flank and P is the chain pitch.

The power transmission chain includes links with different amounts of protrusion of an arc shape of the inside flank. In one embodiment of this invention, the links are placed in an irregular pattern in the chain in the direction of the length of the chain.

According to this invention, various pitches of the chain are related by $P_2 \geq P_1 \geq P_3$ and, at the same time, the radius of curvature R of the inside flank of the tooth of the link plate is $R \geq 2 \times P$, in relation to chain pitch P. Therefore, the inside flanks of the links contact the teeth of the sprocket first at the beginning of engagement of the sprocket and the inside flanks push up the chord of the chain. This reduces the chordal motion of the chain. When the links engage or seat in the sprocket, the outside flanks of the link plates contact the teeth of the sprocket. In this manner, contact between links and sprockets occurs in two steps, leading to noise reduction.

The relationship between the radius of curvature R (crotch R) of the inside flank of the link plate and the chordal motion $\Delta T$ of the chain is shown in FIG. 7. In FIG. 7, the abscissa shows the size of the crotch R in integer multiples of chain pitch P. In FIG. 7, when R was 1.5×P, as in the conventional chain, the chordal motion $\Delta T$ was 0.20 mm. But when R is increased to 2×P, the chordal motion $\Delta T$ decreases to 0.05 mm. According to the relationship set forth in FIG. 6, the noise is therefore reduced by approximately 6 db from the conventional chain, as a result of the decrease in chordal motion.

When R is increased to 2×P, engagement between the chain and sprocket is as shown in FIG. 8. That is, silent chain 40 on sprocket 60 forms a polygonal shape at the points where the connecting pins 53 connect the link. At the location of the beginning of engagement with sprocket 60, chain 40 is lifted by $\Delta T$ in the direction of the arrow in FIG. 8 (up/down direction) because of contact of the inside flank of the link with the sprocket. As explained above, this invention can suppress the chordal motion of the chain and reduce noise.

Additionally, in another embodiment of this invention, the amounts of curvature or protrusion of the inside flanks (arc shape) of the links are irregular in the direction of the length of the chain. By irregular it is meant that the sets of links are placed in a pattern in the chain so that the amounts of curvature of the links in different sets varies by set throughout the length of the chain. In this manner, the noise generated during operation of the chain is made noncyclic or "random," so that unpleasant noise can be reduced. Examples of conventional chain with sets of links having different amounts of curvature in random patterns are U.S. Pat. No. 4,342,560 and U.S. Pat. No. 4,832,668.

DETAILED DESCRIPTION OF THE PREFERRED EMBODIMENTS

Figure 1:
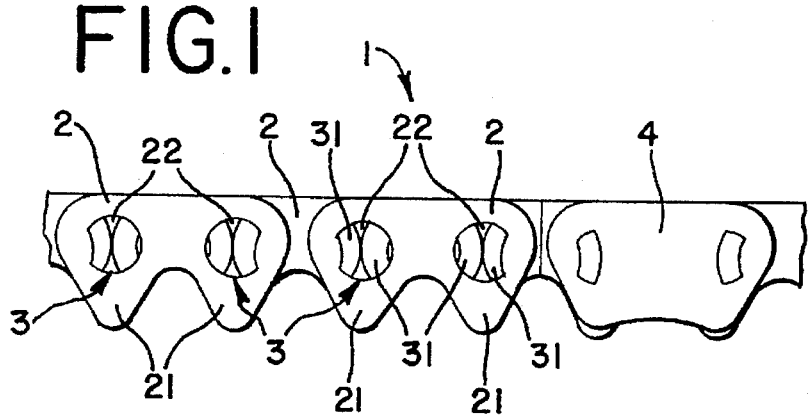
FIG. 1 is a front view of a portion of a silent chain of one embodiment of the present invention.
Figure 2:
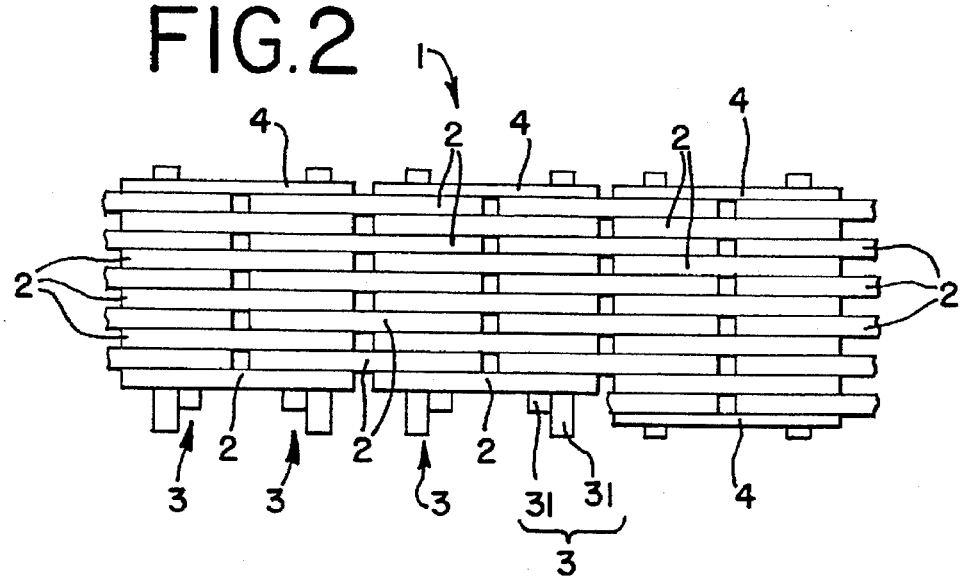
FIG. 2 is a top view of the silent chain of FIG. 1.

As shown in FIGS. 1 and 2, in one embodiment of the present invention, a silent chain is formed of rows or sets of interleaved links 2. Each link includes a pair of teeth 21 and a pair of apertures or pinholes 22. Rocker joint 3, comprised of one pair of long and short rocker pins 31, is inserted in each pinhole 22 of link plate 2. Link plates 2 can be pivotally connected guide plates 4 are placed on the outermost sides of the sets of links.

Figure 3:
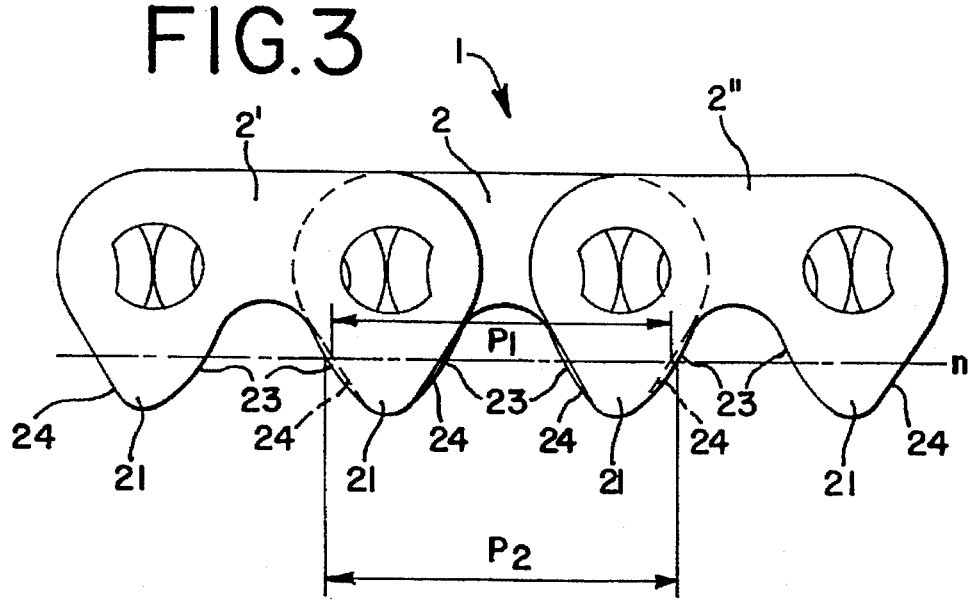
FIG. 3 is an enlargement of a portion of the chain of FIG. 1.

As shown in FIG. 3, inside flank 23 of each tooth 21 of links 2, 2' and 2" is in an arc shape and outside flank 24 is nearly straight. At the same time, inside flank 23 is formed to protrude from outside flank 24 in the proximity of the engagement pitch line n (dash-dot line n in the figure), when silent chain 1 is stretched almost straight.

That is, the relationship $P_2 \geq P_1$ is obeyed where $P_1$ is the pitch between the outside flanks on engagement pitch line n of link plates 2, and $P_2$ is the pitch between the inside flanks on engagement pitch line n of the two other link plates 2' and 2" that overlap on one pair of teeth 21 of link plate 2.

Figure 4:
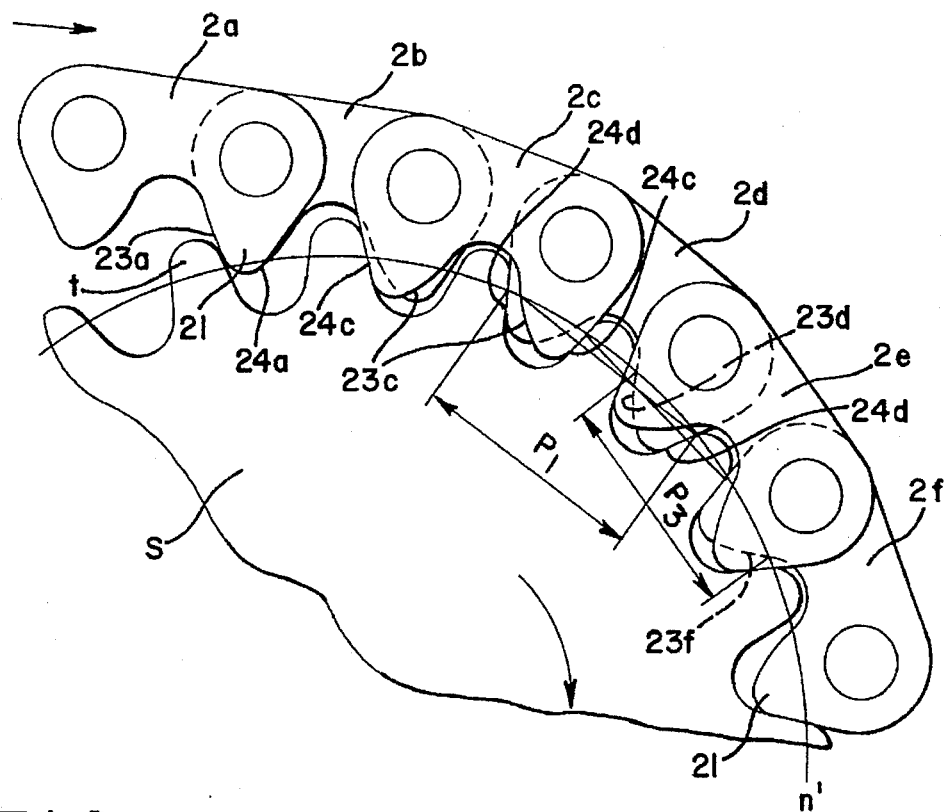
FIG. 4 illustrates the engagement of the silent chain with a sprocket.

Also, the relationship $P_1 \geq P_3$ is obeyed, where $P_3$ is the pitch between inside flanks 23d and 23f on engagement pitch line n of the two other link plates 2d and 2f that overlap one pair of teeth 21 of link plate 2e, which engages with tooth t of sprocket S when silent chain 1 wraps itself around sprocket S, as shown in FIG. 4.

Therefore, the above can be summarized as the relationship $$P_2 \geq P_1 \geq P_3$$

which exists among pitches $P_1$, $P_2$ and $P_3$. Incidentally, here, "=" means "≈".

Figure 5:
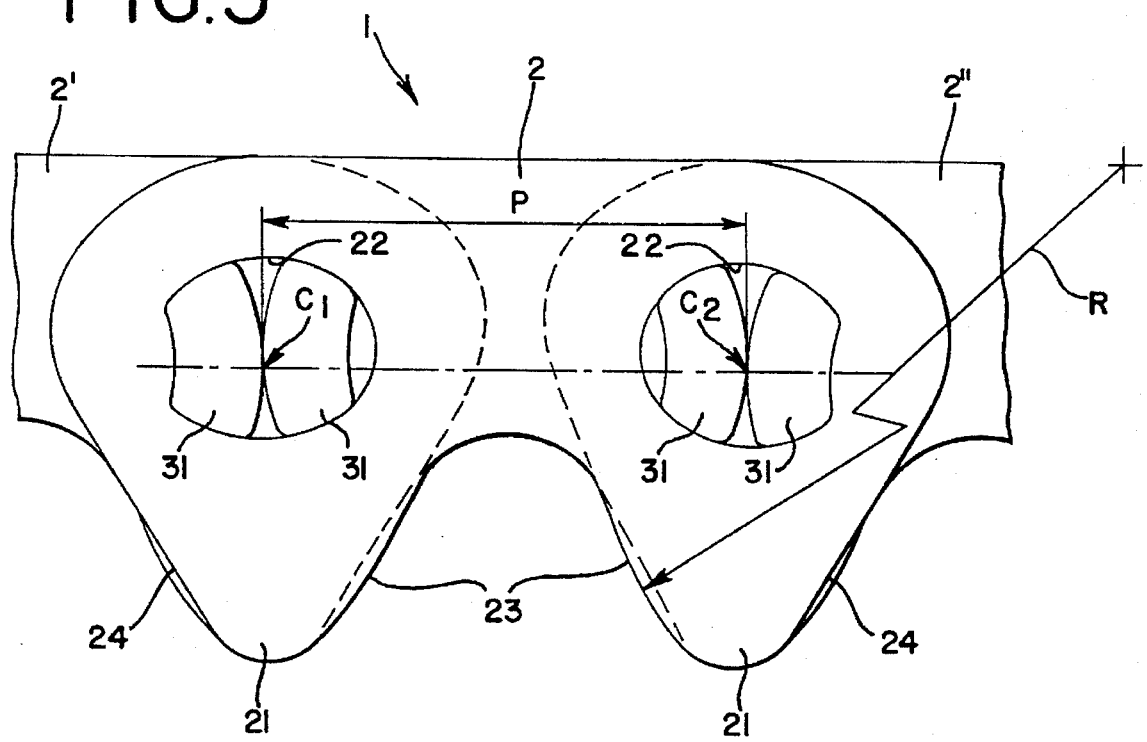
FIG. 5 is an enlargement of a portion of the chain of FIG. 3.

In addition, as shown in FIG. 5, the relation $$R \geq 2 \times P$$

holds for the radius of curvature R of inside flank 23 of link plate 2 Incidentally, here "=" means "≈", also Here, chain pitch P is the distance between $C_1$ and $C_2$, where $C_1$ and $C_2$ are contact points of rocker pins 31 and 31 of link plate 2, when silent chain 1 is stretched straight, as in FIG. 1. Therefore, the dash-dot line passing through $C_1$ and $C_2$ in FIG. 5 indicates the chain pitch line.

When chain 1 of the above-described composition engages sprocket S, inside flank 23a of tooth 21 of link plate 2a contacts a part or its proximity on pitch circle n' of tooth t of sprocket S, at the start of the engagement, as shown in FIG. 4.

Figure 8:
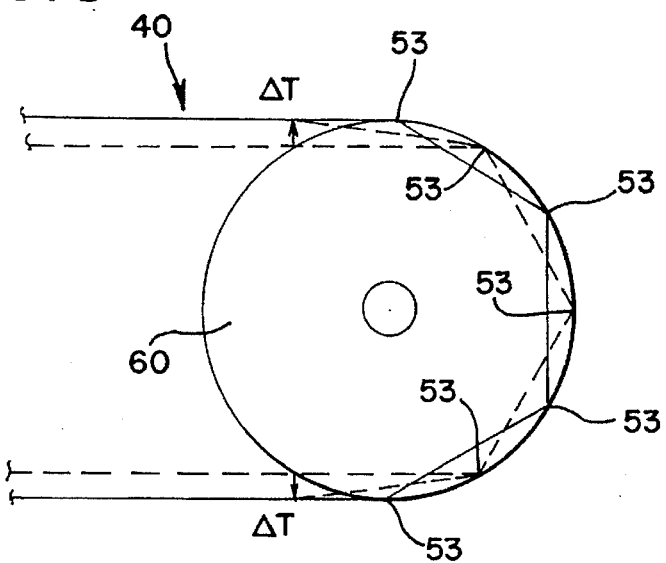
FIG. 8 is an schematic illustrating the engagement of the silent chain of this invention with a sprocket.
Figure 9:
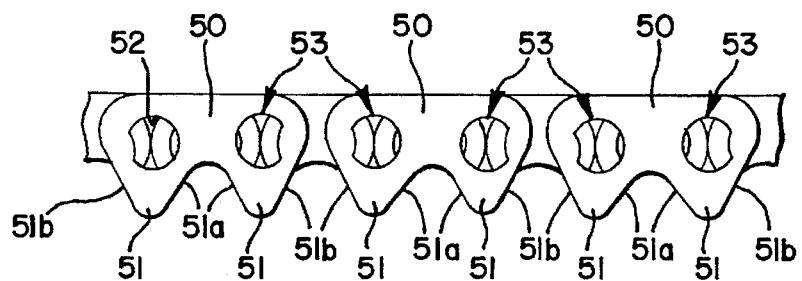
FIG. 9 is a conventional silent chain of the prior art.
Figure 10:
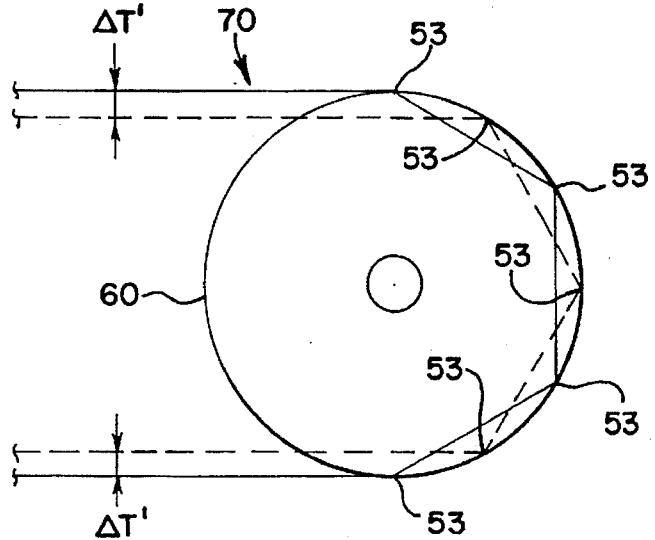
FIG. 10 is a schematic illustrating the engagement of a conventional silent chain of the prior art with a sprocket.

At that time, link plate 2a is lifted by ΔT (see FIG. 8) by tooth t of sprocket S because R of inside flank 23a of link plate 2a is set to approximately twice or larger than chain pitch P.

Next, when chain 1 wraps around sprocket S, both outside flanks 24c contact tooth t of sprocket S as in the case of link plate 2c (FIG. 4). Thereafter, chain 1 maintains this condition until it separates from sprocket S (see link plates 2d, 2e and 2f).

When chain 1 separates from sprocket S, inside flank 23 of link plate 2 contacts tooth t of sprocket S, similarly to the start of engagement. Thereby, link plate 21, about to separate from sprocket S, is lifted up by ΔT (see FIG. 8).

Figure 6:
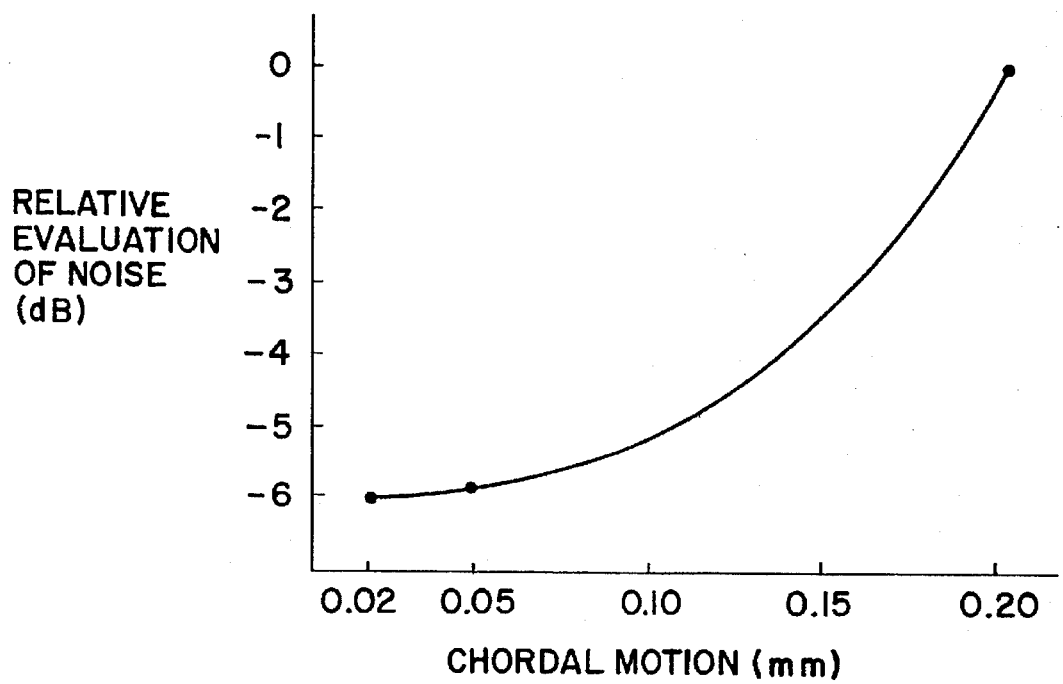
FIG. 6 illustrates the empirical relationship between the chordal motion (in mm) and the relative evaluation value of the noise (in dB).
Figure 7:
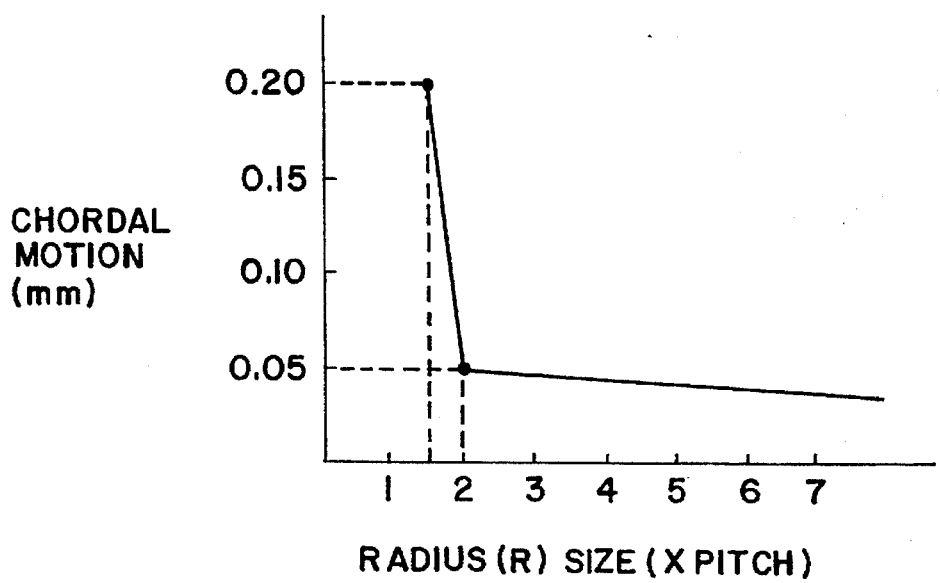
FIG. 7 is an illustration of the relationship between the size of the inside radius R and the chordal motion.

Link plate 2 is lifted up by inside flank 23 during its start of engagement with sprocket S and its separation from the sprocket, therefore the chordal motion of chain 1 is suppressed to approximately 0.05 mm (see FIG. 7) and, as a result, noise is reduced (see FIG. 6).

Also, the contact between link plate 2 and tooth t of sprocket S is in two steps, i.e. inside flank 23 contacts first, then outside flank 24 contacts, which results in a reduction of noise.

As explained above, various pitches of the chain are set to $P_2 \geq P_1 \geq P_3$ and the radius of curvature R of inside flank 23 of link plate 2 is set to approximately twice chain pitch P or larger. Therefore, chordal motion of the chain is suppressed and the noise is reduced.

Incidentally, this invention is applied to a rocker-joint-type silent chain in this embodiment, but this invention can be applied to a silent chain that uses round pins instead of rocker joints. Also, this invention can be applied to the so-called random-type silent chain, in which the amount of protrusion of the inside flank is made irregular in the direction of the length of the chain.

As shown above, in the power transmission chain of this invention, the shapes of the inside and outside flanks that comprise the teeth of the link plates satisfy a relationship $P_2 \geq P_1 P_3$ and the radius of curvature R of the inside flank satisfies $R \geq 2 \times P$, so that the chordal motion of the chain can be suppressed and the noise can be reduced.

What is claimed is:

1. A power transmission chain comprising:

a plurality of links, each link having a pair of teeth and a pair of apertures, said links being interleaved and connected by pins inserted into the apertures, the shape of the inside and outside flanks of each tooth of the links is constructed having the relationship $$P_2 \geq P_1 \geq P_3$$

where $P_1$ is the pitch between the outside flanks on the pitch line of the link, $P_2$ is the pitch between the inside flanks of the teeth of the two adjacent links and the teeth of the links when the chain is stretched nearly straight, and $P_3$ is the pitch between the inside flanks when the chain is placed on a sprocket, the shape of the inside flank having an arc shape of a finite radius of curvature R so that $$R \geq 2 \times P$$

where R is the radius of curvature of the inside flank and P is the chain pitch.

2. A power transmission chain comprising:

a plurality of links, each link having a pair of teeth and a pair of apertures, said links being interleaved and connected by pins inserted into the apertures, the shape of the inside and outside flanks of each tooth of the links is constructed having the relationship $$P_2 \geq P_1 \geq P_3$$

where $P_1$ is the pitch between the outside flanks on the pitch line of the link, $P_2$ is the pitch between the inside flanks of the teeth of the two adjacent links and the teeth of the links when the chain is stretched nearly straight, and $P_3$ is the pitch between the inside flanks when the chain is placed on a sprocket, the shape of the inside flank being shaped so that $$R \geq 2 \times P$$

where R is the radius of curvature of the inside flank and P is the chain pitch; and wherein said links have different amounts of protrusion of an arc shape of the inside flank, said links being placed in an irregular pattern in the direction of the length of the chain.

* * * * *